ns of
ascorbic acid and semolina are such that when one ounce
of the resulting "diluted" mixture is added to one hundred
pounds of semolina, an ascorbic acid content of 0.001%
is obtained. The dilute mixture is added to the bulk of
the semolina with the aid of a powder feeder, and the
product is subjected immediately to complete mixing and
agitation.

3,043,699
ASCORBIC ACID FOR COLOR STABILIZATION IN WHEAT FLOUR

Frederick D. Schmalz and Norton W. Risdal, Minneapolis, Minn., assignors to F. H. Peavey & Company, Minneapolis, Minn., a corporation of Minnesota
No Drawing. Filed July 2, 1959, Ser. No. 824,464
8 Claims. (Cl. 99—85)

The present invention relates to improvements in flour used to produce alimentary paste food products, and more particularly to such flour and the resulting pastes stabilized against loss of desirable color.

It is customary to use wheaten materials such as semolina, farina, durum wheat flour, or unbleached flour milled from hard spring wheat or hard winter wheat for the preparation of alimentary pastes, such as macaroni and noodle products. In preparing such products, the ingredients which may be one or more of the above-mentioned wheat materials and enriching substances, or other common additives, such as vitamins, salt, and disodium phosphate, are dry mixed and then made in a dough or paste with water (or milk), extruded into desired shape and dried. This processing, as well as storage of the flour or other wheat material after milling, is attended by a loss of the very desirable characteristic golden yellow color of the unbleached wheat and wheat flour. This desirable color is identified with the relatively high carotenoid pigment content of these wheat materials. The resulting macaroni and noodle, or other alimentary paste food products consequently do not possess their characteristic and desirable lemon yellow color, which is indicative of a better quality in the paste products. Avoidance of this color loss by providing alimentary paste flour or other milled wheat materials which retain their characteristic yellow color is a desired objective as yet unrealized.

It has been found according to the invention that unbleached flour or other milled wheat material used for alimentary pastes may be stabilized against this color loss by incorporation of very small but effective quantities of 1-ascorbic acid. The ascorbic acid addition at the same time improves the cooking qualities of the alimentary paste by increasing stability to deformation of the shaped pieces when cooked, and by improving its resistance to stickiness. It was determined that as little as 0.001% ascorbic acid based on the weight of the flour prevented the loss of color and conversely resulted in retention of the desirable golden yellow color during storage and alimentary paste product preparation. In vew of variations occurring in durum wheat and the other wheat raw materials used, due to growing conditions and other varietal influences, the most effective quantities of ascorbic acid may vary from even less than 0.001 to somewhat greater than 0.005% (from about 10 to about 50 parts per million of flour). Quantities as high as 0.01% are not required for the purpose intended and may adversely affect the cooking quality of the alimentary paste product. Accordingly, any effective amount below 0.01% is suitable, although 0.005% or less is preferred.

Although 1-ascorbic acid as such is preferred in the practice of the invention, other substances may be used which supply this compound $C_6H_8O_6$ in the quantities above-indicated and which do not exert any deleterious effect on the flour or the alimentary paste food product prepared from it. It is to be noted, however, that salts of 1-ascorbic acid have been found not suitable for the purpose.

The invention is further described with reference to the following example which constitutes a complete specific embodiment thereof, but is not to be construed as a limitation:

Example 1-ascorbic acid in the form of an ultra fine powder is first diluted by mixing with semolina (prepared by grinding and bolting cleaned durum wheat to such fineness that it passes a 20 mesh sieve (U.S. standard screen) but not more than 3% passes a 100 mesh sieve, the wheat being bran coat and germ freed to an ash content on a moisture free basis of not more than 0.92% and having a moisture content of not more than 15%). The proportions of ascorbic acid and semolina are such that when one ounce of the resulting "diluted" mixture is added to one hundred pounds of semolina, an ascorbic acid content of 0.001% is obtained. The dilute mixture is added to the bulk of the semolina with the aid of a powder feeder, and the product is subjected immediately to complete mixing and agitation.

During periods of storage, the golden yellow color of the durum wheat is retained. Upon subsequent preparation of a paste from the mixture by addition of water in a mixing vat followed by extrusion through dies to form shaped units of dough and drying, the retained color of the durum wheat provides the desired yellow shade in the final product.

The invention is applicable to any wheaten product used in the manufacture of alimentary pastes, such as the macaroni and noodle products set forth in part 16, chapter I, title 21 entitled "Food and Drugs, Alimentary Pastes; Definitions and Standards of Identity, Macaroni and Noodle Products," pages 23 to 29, inclusive, of the Definitions and Standards for Food issued by the Food and Drug Administration, Federal Security Agency under the Food, Drug and Cosmetic Act. The more common wheaten products used for this purpose include semolina, durum flour, farina, flour or any combination of two or more of these products. Also, the invention is fully applicable where various enriching ingredients are utilized, such as vitamins and minerals, e.g. B vitamins (thiamine, riboflavin, niacin or niacinamide), vitamin D, iron and calcium.

It is to be noted that ascorbic acid and alkali metal ascorbates have been utilized for their physiological vitamin C value and to increase baking strength in flour for bread making. In the present invention, however, the ascorbic acid functions differently to stabilize against loss of the desirable golden yellow color in unbleached flour or other wheat products used for making alimentary paste products.

All quantities referred to are in percent by weight unless otherwise indicated.

As used in the appended claims, the term "flour" includes all wheaten products and mixtures included in above-referenced "Definitions and Standards of Identity," whether coarser ground and bolted, as in the case of semolina and farina, or ground and bolted to the fineness of flour used in the more common and limited sense.

The invention has been described with reference to specific embodiments. However, various modifications may be made without departing from the spirit of the invention, and these are included within its scope.

What we claim is:

1. Unbleached wheat flour for alimentary paste food products having a relatively high carotenoid pigment content imparting a characteristic golden yellow color thereto, said flour containing effective color-stabilizing amounts of 1-ascorbic acid less than about 0.01% by weight.

2. Flour according to claim 1 having an ascorbic acid content of from .001 to .005%.

3. Wheat flour having a relatively high carotenoid pigment content and a characteristic golden yellow color stabilized against color loss by a content of 1-ascorbic acid effective to retain said color and not exceeding about 0.005%.

4. Alimentary paste food products made from wheat flour with a relatively high carotenoid pigment content imparting a golden yellow color thereto, said products being stabilized against loss of said color by a color-retaining content of 1-ascorbic less than about 0.01%.

5. Wheat products selected from the group consisting of semolina, farina, durum flour, flour and mixtures thereof having a relatively high carotenoid pigment content which provides a characteristic golden color, said products containing from about 0.001% to about 0.005% 1-ascorbic acid to retain said color.

6. A method of stabilizing wheat flour used in the preparation of alimentary pastes against loss of characteristic yellow color imparted by a relatively high carotenoid pigment content which comprises mixing 1-ascarbic acid with a small aliquot portion of said flour, incorporating the flour-diluted ascorbic acid into the bulk of the flour with mixing and agitation, the amounts of flour and ascorbic acid being proportioned to provide an effective color-stabilizing ascorbic acid content of less than 0.01%.

7. A method according to claim 6 in which the ascorbic acid content is from 0.001 to 0.005%.

8. Alimentary paste food products made from a preformed dry mixture of wheaten products of relatively high carotenoid pigment content selected from the group consisting of semolina, farina, durum flour, flour and mixtures thereof having a characteristic golden yellow color and color-retaining amounts of 1-ascorbic acid of from about 0.001 to 0.005%.

References Cited in the file of this patent

UNITED STATES PATENTS

| | | |
|---|---|---|
| 2,074,064 | Rask | Mar. 16, 1937 |
| 2,215,168 | Allred | Sept. 17, 1940 |
| 2,792,304 | Pavan | May 14, 1957 |

FOREIGN PATENTS

| | | |
|---|---|---|
| 700,869 | Great Britain | Dec. 9, 1953 |

OTHER REFERENCES

"Efahrungen mit der Verwendung von 1-ascorbinsaure als Backhulfsmittel und ihre chemische Bestimmung in Mehl," A. Menger, Getreide u. Mehl, 1954, 4, 89–92; abstracted in Food Science Abstracts, vol. 27, No. 3 (May 1955), page 328, abstract relied on.